United States Patent [19]

O'Steen

[11] 4,040,141
[45] Aug. 9, 1977

[54] WINDSHIELD WIPER INSTALLATION

[76] Inventor: Alvan D. O'Steen, 1813 S. Dixie, West Palm Beach, Fla. 33401

[21] Appl. No.: 647,701

[22] Filed: Jan. 9, 1976

Related U.S. Application Data

[63] Continuation-in-part of Ser. No. 513,573, Oct. 10, 1974, abandoned.

[51] Int. Cl.² ............................................... B60S 1/04
[52] U.S. Cl. ............................. 15/250.19; 15/250.16
[58] Field of Search ................ 15/250, 250.19, 250.16, 15/250.35–250.42

[56] References Cited

U.S. PATENT DOCUMENTS

| 1,946,119 | 2/1934 | Auken | 15/250.19 |
| 2,131,341 | 9/1938 | Waters | 15/250.19 |
| 2,284,844 | 6/1942 | Rappl | 15/250.19 |
| 3,019,468 | 2/1962 | Hatch | 15/250.19 |
| 3,224,026 | 12/1965 | Trzebinski | 15/250.19 |

Primary Examiner—Peter Feldman

[57] ABSTRACT

An improved windshield wiper installation in which the windshield wiper blade is held free and clear of abutting surfaces when in a good weather position by dual cam means operatively urging the spring holding means away from abutting surfaces and maintaining the blade in a stabilized condition.

3 Claims, 4 Drawing Figures

WINDSHIELD WIPER INSTALLATION

This is a continuation-in-part of my earlier copending patent application Ser. No. 513,573, filed Oct. 10, 1974, now abandoned.

FIELD OF THE INVENTION

This invention relates to windshield wipers and, more particularly, to a means for holding a windshield wiper out of contact with abutment surfaces when in a good weather position and stabilized in a predetermined attitude.

BACKGROUND OF THE INVENTION

As is perhaps well known, in use windshield wipers are spring biased into firm wiping engagement with the glass surface; however, this load or pressure also causes the wiping surfaces of the windshield wiper to be bowed under the load or pressure when not in use. In the hot sun when under pressure they often stick and crack. It is desirable that the blade be free from loads when not in use; and, accordingly, this invention has an object the provision of means to hold the blade in a stored positon in which it is stabilized away from abutting surfaces when not in use, that is when in a good weather position to prolong the life of the blade.

It is a specific object of the disclosure herein to provide a means for relaxing the pressure or load on a windshield wiper blade when in a good weather condition which includes dual cam means and cam follower means mutually intercooperating in the path of movement of the blade and at the good weather position whereby the blade is stored in a position wherein the wiper surface is spaced slightly from the surface to be wiped and in a normal relaxed or unstressed condition and in which position the blade is stabilized so as not to wobble or cause undesired noises.

In accordance with these and other objects which will become apparent hereinafter, the instant invention will now be described with reference to the accompanying drawings in which.

DESCRIPTION OF A PREFERRED EMBODIMENT

Figure 1:
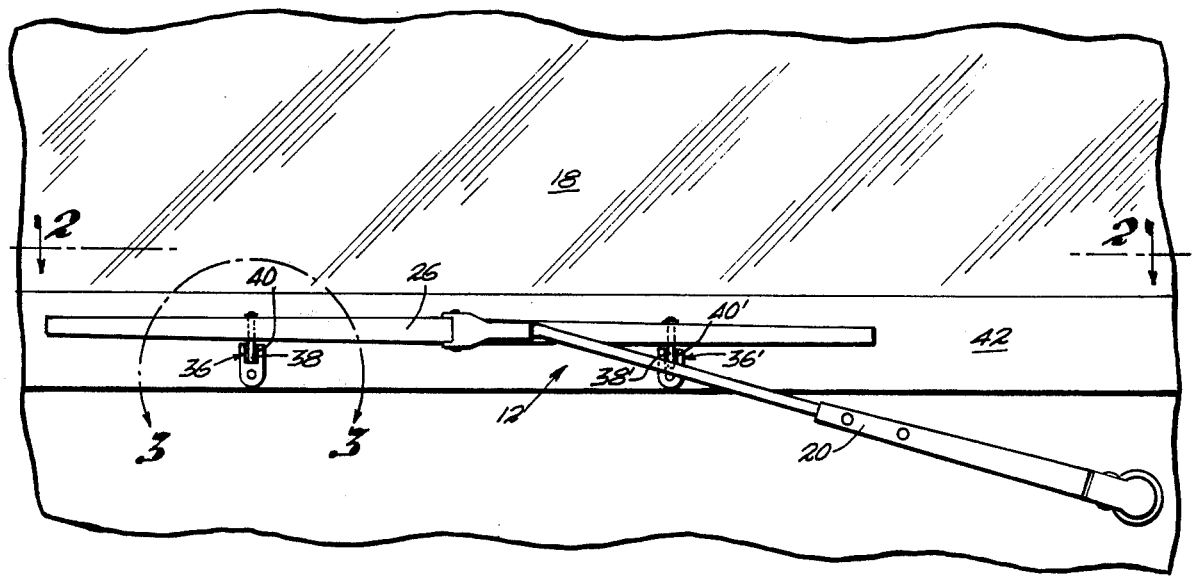
FIG. 1 is a partial front elevational view of a windshield and associated windshield wiper assembly, with the assembly in a stored position.
Figure 2:
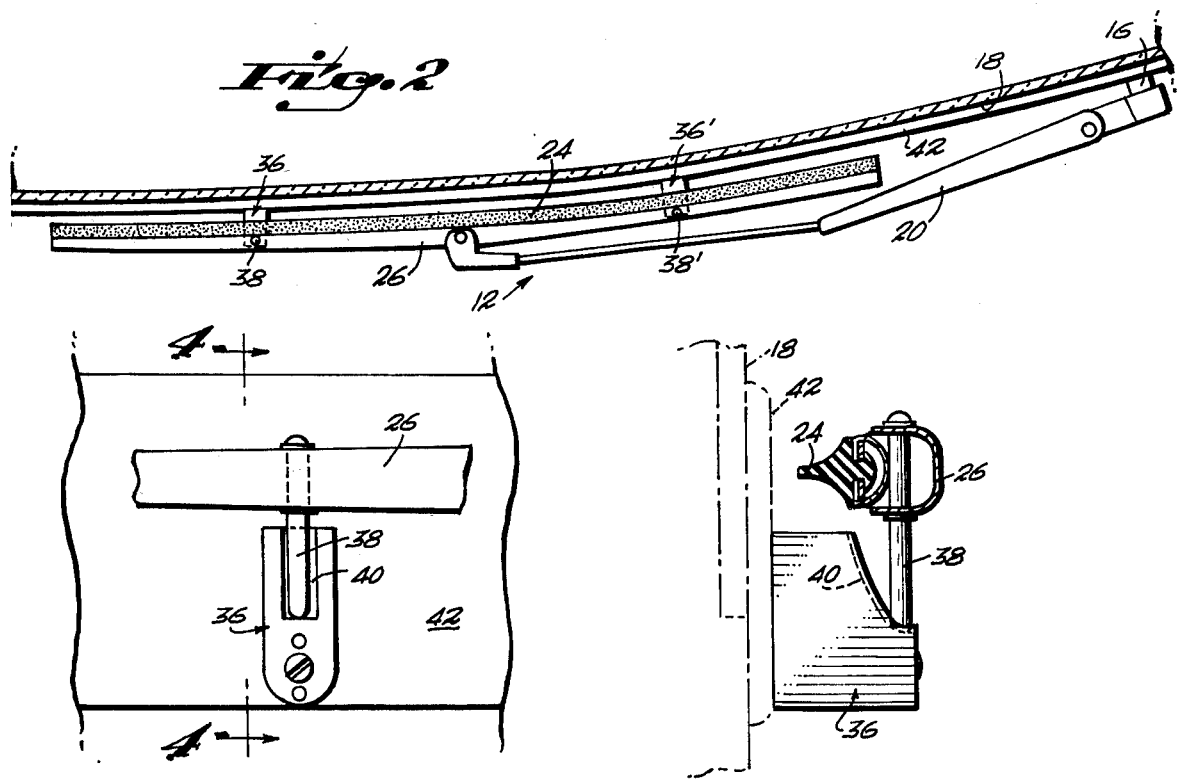
FIG. 2 is a partial view in cross section taken along the plane indicated along the line 2—2 of FIG. 1 and looking in the direction of the arrows.
Figure 3:
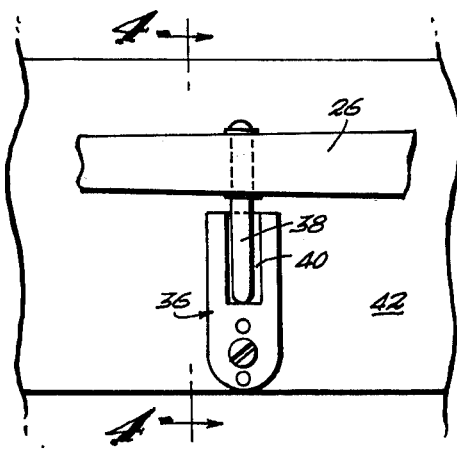
FIG. 3 is a partial and enlarged view of the portion of FIG. 1 with the arrowed line 3—3 therearound.

Referring to the drawings wherein like reference characters designate like or corresponding parts throughout the several views and referring particularly to FIG. 1, the numeral 12 indicates a windshield wiper assembly which is connected in a conventional manner to a drive shaft as at 16 for cyclical wiping movement over the windshield surface 18. The assembly, as is conventional, includes an arm 20 conventionally spring biased to urge the wiper blade 24 into wiping engagement with the glass, and it includes the blade holder portion 26 of the arm so that in use firm wiping engagement of the blade with the surface of the windshield is achieved. In the past, the wipe portion of the blade 24 which is relatively thin as seen in cross section is bowed under the influence of spring biasing, not only when in use but, also, when in a good weather position. As shown in FIGS. 1 and 2, the present invention, as seen, includes dual cam means to hold the wiper portion away from all surfaces of abutment so that the wiper portion is not under a load and bowed about its longitudinal axis when in the "at rest" position, illustrated. As seen in the drawings a preferred embodiment may comprise a first and a second cam 36–36' in the path of the travel of the blade to the good weather position to cam and urge pins 38 and 38' in the holder with the blade outwardly over the cam surface 40 and 40' coacting with dual cam follower surfaces on the blade assembly, a distance away from all surfaces greater than the limit of movement of the blade caused by the spring to preserve the blade thus providing longer life.

Figure 4:
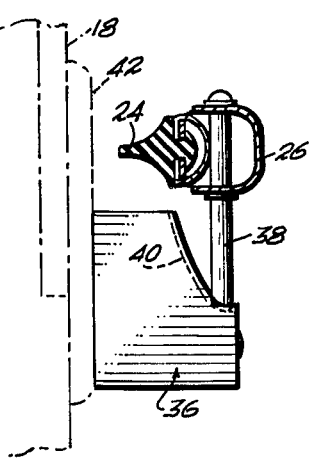
FIG. 4 is a view in cross section taken on the plane indicated by the line 4—4 of FIG. 3.

In the preferred embodiment illustrated the cams 36 and 36' are fastened to a strip 42, beneath the windshield, on opposite sides of the blade centerpoint when in a stored or parked condition with the respective cam surfaces being grooved to define guide tracks for the pins or cam followers to the stored condition shown in FIG. 4.

What is claimed is:

1. In combination with a vehicle having a windshield including an arcuate, convex outer surface and a lower horizontal margin, a windshield wiper shaft adjacent the margin and a windshield wiper assembly for wiping an arcuate sector of the upper convex surface bordered by a portion of the lower horizontal margin, said windshield wiper assembly including:

a support arm with a first end zone and a second end zone and said arm being normally disposed below the horizontal margin of the windshield at an "at rest" parked position, means to mount the second end zone to said shaft for cyclical movement of said arm through an arc over a portion of said convex outer surface adjacent said lower horizontal margin;

an elongate wiper blade holder portion having a first end, a second end and an intermediate length with a mid-zone, and means mounting the mid-zone to the first end zone of said support arm for movement therewith from said normal "at rest" parked position below the horizontal margin and cyclically through said arc;

said assembly including a resilient blade portion extending longitudinally of said elongate blade holder portion and projecting toward said horizontal margin and convex outer surface, means holding said blade portion to said holder portion and including means normally spring urging the resilient blade outwardly of the holder portion and toward wiping engagement with the convex outer surface, a blade parking means on the vehicle and means to fix the blade parking means below the horizontal margin and said parking means including structure projecting laterally toward the elongate blade holder portion on said support arm when said arm is at the at rest position, said blade parking means comprising a first and a second cam block element in spaced relation with respect to one another and each including a cam track extending vertically and diverging angularly from said convex outer surface adjacent the horizontal margin of the windshield and having a portion comprising a support portion when said wiper blade is in the at rest position, said elongate blade holder portion having a first and a second cam follower surface each adjacent said first and second ends respectively and each engaging respectively said first and second cam block element at said support portions when at the at rest position and said cam follower surfaces being adapted to progressively bias the elongate wiper blade holder portion and the resilient wiper blade out of engagement with the vehicle upon movement below the horizontal margin of the windshield to the at rest position, whereby movement of the at rest position of the windshield wiper assembly results in the resilient wiper blade being spring urged into engagement with the outer convex windshield surface portion, said follower surfaces each comprising outwardly projecting portions and said cam tracks each including said cam surface and side guide surfaces sized to receive said projecting portions of the cam follower surfaces therebetween to constrain the same to movement to the at rest position and to maintain the assembly against lateral forces.

2. The device as set forth in claim 1 wherein the outwardly projecting portions each comprise a first and a second pin with the terminal ends of each pin comprising the cam follower surface.

3. The device as set forth in claim 2 wherein the pins extend through said assembly.

* * * * *